US006276524B1

United States Patent
Cerda-Vilaplana et al.

(10) Patent No.: US 6,276,524 B1
(45) Date of Patent: Aug. 21, 2001

(54) CASE FOR DISC-SHAPED OPTICAL RECORDING MEDIUM SUCH AS CD, DVD OR THE LIKE

(75) Inventors: Gustavo Cerda-Vilaplana; Ruben Cerda-Torres, both of Ibi (ES)

(73) Assignees: Magnetic Imatge, S.A.; Cervic, S.A., both of (ES)

( * ) Notice: Subject to any disclaimer, the term of this patent is extended or adjusted under 35 U.S.C. 154(b) by 0 days.

(21) Appl. No.: 09/381,023

(22) PCT Filed: Dec. 22, 1998

(86) PCT No.: PCT/ES98/00352

§ 371 Date: Sep. 14, 1999

§ 102(e) Date: Sep. 14, 1999

(87) PCT Pub. No.: WO99/36919

PCT Pub. Date: Jul. 22, 1999

(30) Foreign Application Priority Data

Jan. 19, 1998 (ES) ................................................ 9800127 U
Nov. 13, 1998 (ES) ................................................ 9802865 U

(51) Int. Cl.[7] .................................................. B65D 85/57
(52) U.S. Cl. ........................................ 206/308.1; 206/310
(58) Field of Search ................................. 206/308.1, 310, 206/493

(56) References Cited

U.S. PATENT DOCUMENTS

| 5,515,968 | | 5/1996 | Taniyama . | |
|---|---|---|---|---|
| 5,727,680 | * | 3/1998 | Liu | 206/310 X |
| 5,887,713 | * | 3/1999 | Smith et al. | 206/310 X |
| 5,896,986 | * | 4/1999 | Bolognia et al. | 206/310 |
| 5,944,181 | * | 8/1999 | Lau | 206/310 X |
| 5,950,822 | * | 9/1999 | Cloran et al. | 206/310 |
| 5,996,788 | * | 12/1999 | Belden et al. | 206/310 |

FOREIGN PATENT DOCUMENTS

| WO 8806559 A1 | 9/1988 | (WO). |
|---|---|---|
| WO 9736298 A1 | 5/1996 | (WO). |
| WO 9741563 A1 | 11/1997 | (WO). |

* cited by examiner

*Primary Examiner*—Bryon P. Gehman
(74) *Attorney, Agent, or Firm*—Adams, Schwartz & Evans, P.A.

(57) ABSTRACT

A case for storing a disc-shaped magnetic recording carrier having upper and lower faces, an outer edge, and an inner edge defining a central circular opening. The case includes a floor positioned within a frame. A plurality of spaced-apart segments are connected to the floor to form a cylindrical rim and cooperate with one another to engage the outer edge of the magnetic recording carrier. A first cylindrical raised seat is positioned in a central location on the floor and is adapted for receiving the recording carrier thereon. A second cylindrical raised seat is positioned in a central location on the first cylindrical raised seat. The second cylindrical raised seat includes a button positioned above the horizontal plane and on an upper face of the second cylindrical raised seat. The button includes polygonal sidewalls having upper and lower edges, and a face having an outer edge connected to the upper edge. A plurality of spaced-apart tabs are positioned adjacent the polygonal sidewalls and are movable toward the sidewall in response to radially-directed inward pressure against the tabs. Each of the tabs includes a vertical face having a wedge-shaped notch thereon. The notch is biased towards and engages the inner edge of the opening of the recording carrier in the absence of radially-directed inward pressure against the tab.

14 Claims, 5 Drawing Sheets

CASE FOR DISC-SHAPED OPTICAL RECORDING MEDIUM SUCH AS CD, DVD OR THE LIKE

TECHNICAL FIELD AND BACKGROUND OF THE INVENTION

This invention relates to a case for storing a disc-shaped magnetic recording carrier. Such magnetic recording carriers include but are not limited to digital video discs or digital versatile discs, and compact discs (collectively referred to as "discs"). The case of the present invention includes an improved device for the engagement and release of such discs.

Prior art disc cases for audio, data and software typically include a centrally-located, projecting formation which engages the inner edge of the circular opening defined in the center of the disc. The disc is released from the case in response to response to downward pressure exerted on the projecting formation.

Application ES-U-9703025 discloses a compact disc case having a central formation formed in a button-shape. The case includes flexible lateral branches, each of which has a lower end having a tilted wing connected to and forming an angle near the case wall for permitting the lateral branch to move downwardly in order to release the engagement in the central hole of the disc. Circumferential projections provided in a bottom wall of the case engage the exterior edge of the compact disc and maintains the disc in a slightly flexed condition inside the case.

The storage case of the present invention helps protect a disc stored therein from being exposed to dust, moisture, excessive heat, or other undesirable environmental conditions.

SUMMARY OF THE INVENTION

It is therefore an object of the present invention to provide a case for storing a disc-shaped recording carrier which is easy to manufacture and safe to use.

It is another object of the present invention to provide a case for storing a disc-shaped recording carrier that securely engages the outer edge of the recording carrier for maintaining the recording carrier within the case, yet provides an easy-to-use mechanism permitting release of the recording carrier from the case.

It is another object of the invention to provide a case for storing a disc-shaped recording carrier having stems configured concentrically around a prismatic-hexagonal formation are stems that detach orthogonally upwards from the upper face of a platform for support of the disc and can be biased by flexion through a lateral pressure exercised towards the center of the prismatic-hexagonal formation, each of which has a retention cog having a lower surface positioned at a vertical distance from the support platform of the disc that is of the same magnitude order as the thickness of the disc.

These and other objects of the present invention are achieved in the preferred embodiments disclosed below by providing a case for storing a disc-shaped magnetic recording carrier having upper and lower faces, an outer edge, and an inner edge defining a central circular opening. The case includes a floor positioned within a frame. A plurality of spaced-apart segments are connected to the floor to form a cylindrical rim. The segments cooperate with one another to engage the outer edge of the magnetic recording carrier. A first cylindrical raised seat is positioned in a central location on the floor and is adapted for receiving the recording carrier thereon. A second cylindrical raised seat is positioned in a central location on the first cylindrical raised seat. The second cylindrical raised seat includes a button positioned above the horizontal plane and on an upper face of the second cylindrical raised seat. The button includes polygonal sidewalls having upper and lower edges, and a face having an outer edge connected to the upper edge. A plurality of spaced-apart tabs are positioned adjacent the polygonal sidewalls and are movable toward the sidewalls in response to radially-directed inward pressure against the tabs. Each of the tabs includes a vertical face having a wedge-shaped notch thereon biased towards and engaging the inner edge of the opening of the recording carrier in the absence of radially-directed inward pressure against the tab.

The button includes an even number of polygonal sidewalls.

The tabs are positioned adjacent alternating polygonal sidewalls.

The button includes at least three polygonal sidewalls.

The case includes three spaced-apart tabs.

Each of the vertical faces is carried on the second cylindrical raised seat by an arm having a first end formed with the upper face and a second free end extending inwardly toward the button for supporting the lower face of the recording carrier.

The case includes a flexible hinge connecting the first cylindrical raised seat to the floor for permitting the first and second cylindrical raised seats and the button to be moved toward the floor in response to downward pressure on the face of the button for releasing the recording carrier from the tabs.

BRIEF DESCRIPTION OF THE DRAWINGS

Some of the objects of the invention have been set forth above. Other objects and advantages of the invention will appear as the invention proceeds when taken in conjunction with the following drawings in which.

DESCRIPTION OF THE PREFERRED EMBODIMENT AND THE BEST MODE

Figure 1:
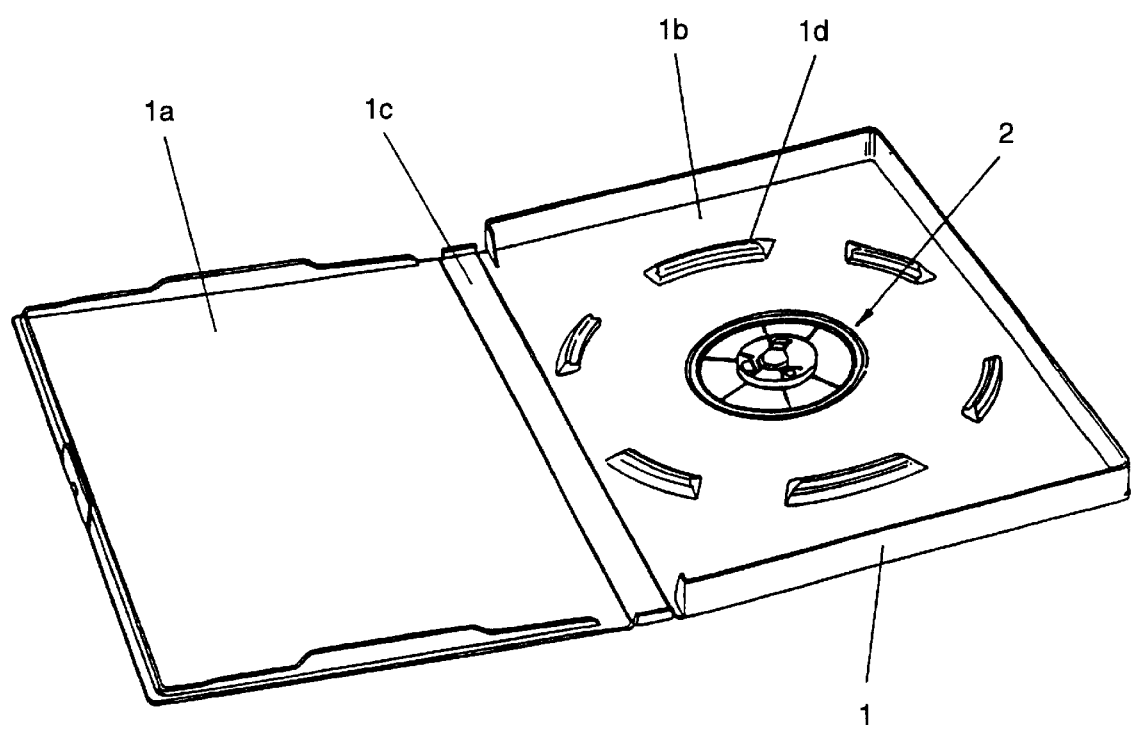
FIG. 1 is a perspective view of a case for storing a disc-shaped magnetic recording carrier according to one embodiment of the invention.

Referring now generally to the drawings, a case for storing a disc-shaped magnetic recording carrier is illustrated in FIG. 1 and shown generally at reference numeral 1. The case 1 includes a cover 1a connected to a bottom wall 1b by a central portion 1c. A plurality of projections 1d are positioned on the floor 1b for engaging the outer edge of a disc-shaped magnetic recording carrier.

Figure 2:
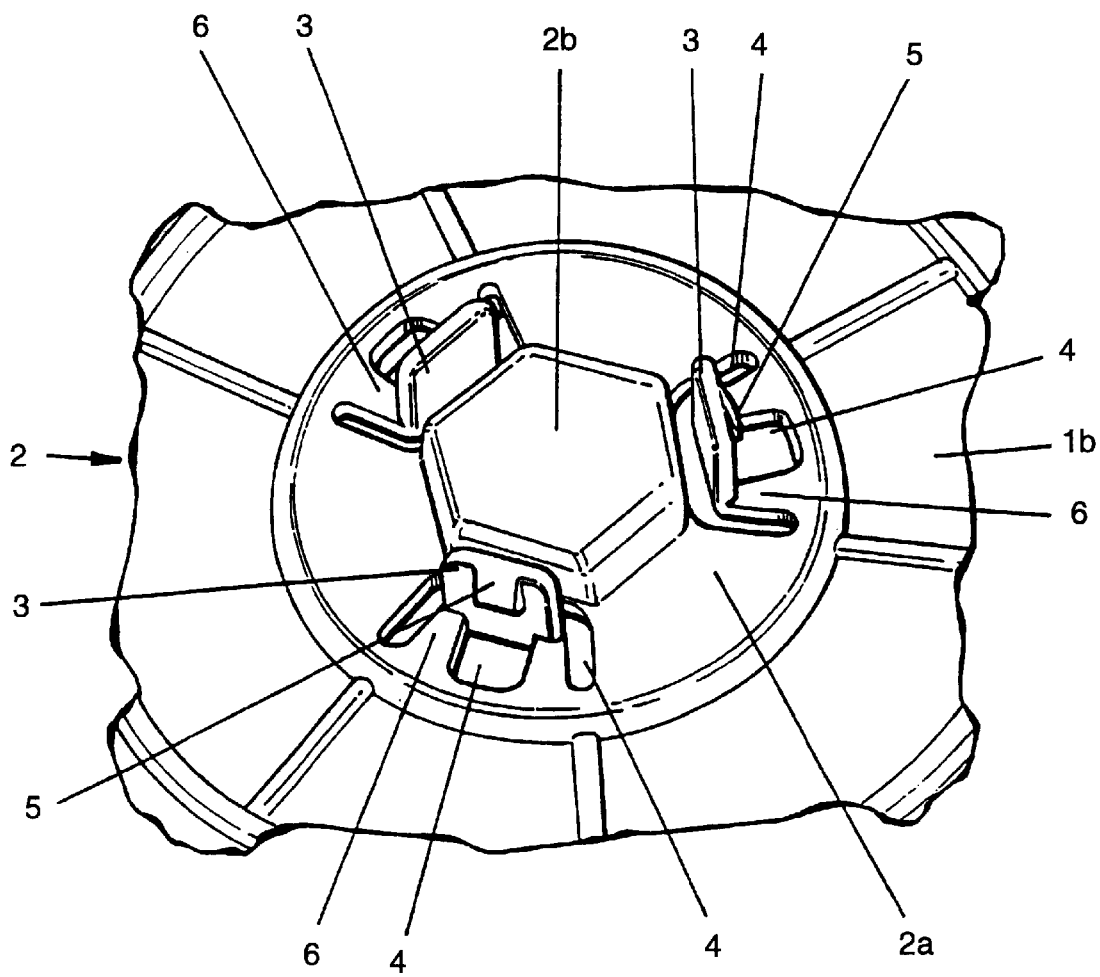
FIG. 2 is a partial perspective view of the case shown in FIG. 1, showing the disc-engaging portion of the case.

Referring now to FIG. 2, a cylindrical platform 2 is positioned on the bottom wall 1b. The cylindrical platform 2 is integrally formed with the bottom wall 1b. As is shown in FIG. 2, a cylindrical formation 2a is positioned in a central location on the cylindrical platform 2. Although cylindrical formation 2a may have any diameter, cylindrical formation 2a has a diameter smaller than that of cylindrical platform 2 for enabling the cylindrical formation 2a to receive and support a disc-shaped magnetic recording carrier. Cylindrical formation 2a includes a prismatic hexagonal projection 2b around which a plurality of stems 3 are positioned. Polygonal button 2b includes six sidewall segments 2c.

Each stem 3 has one end attached to the cylindrical formation and another end which extends orthogonally upwards, and includes a retention cog 5 which extends outwardly away from the hexagonal projection 2b. Each stem 3 is also delimited on its lower part through a notch 4 defined by the cylindrical formation 2a, and is integrally joined to the cylindrical platform 2a by portions 6.

Figure 3:
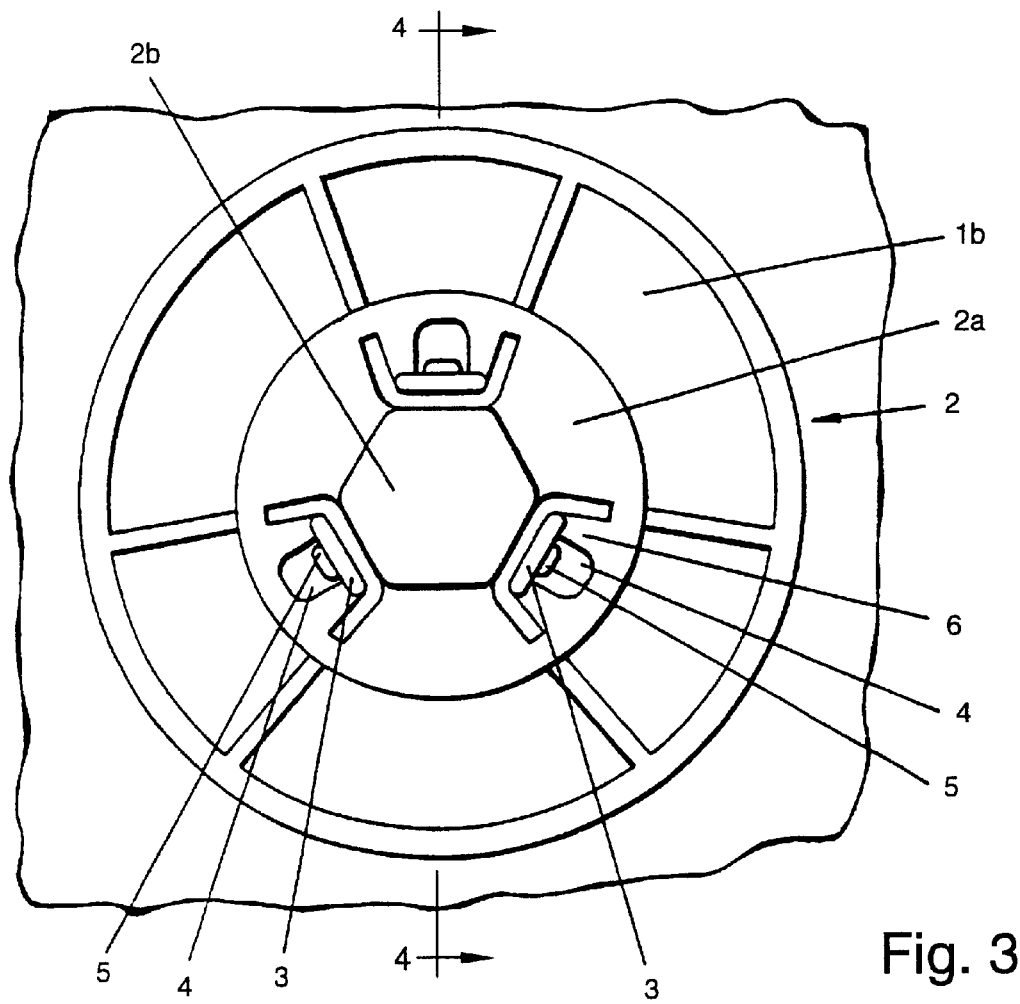
FIG. 3 is a top plan view of the disc-engaging portion of the case shown in FIG. 2
Figure 4:
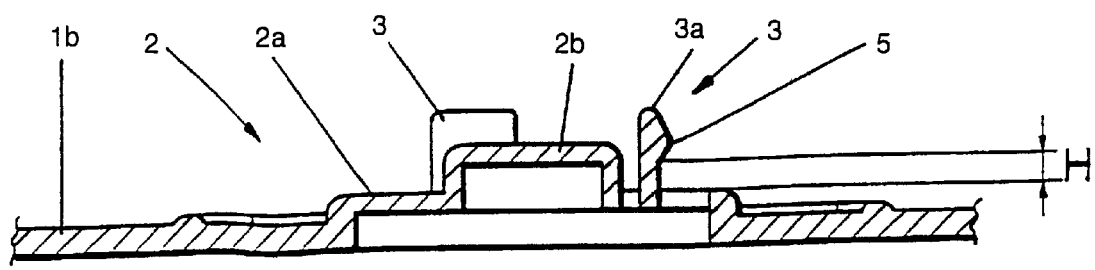
FIG. 4 is a cross-sectional view taken through line 4—4 of FIG. 3.

As is shown in FIG. 3, the case 1 includes three stems 3. Each stem 3 is preferably formed from a rigid, yet relatively elastic plastic material, which allows the stem 3 to be flexed between two angles in response to a force exercised perpendicularly on a free extremity 3a of the stem 3. This permits a DVD or other disc or magnetic recording carrier having a central hole to be easily engaged through the central hole on the stems 3. The magnetic recording carrier is maintained in position on each stem 3 by a retention cog 5. FIG. 4 shows a single retention cog 5, which has a pointed shape for engaging the inner edge of the central hole of the magnetic recording carrier. The magnetic recording carrier is easily removed from the cylindrical formation 2a by exerting a radially-directed force against the free extremities 3a of at least two of the stems 3.

Figure 5:
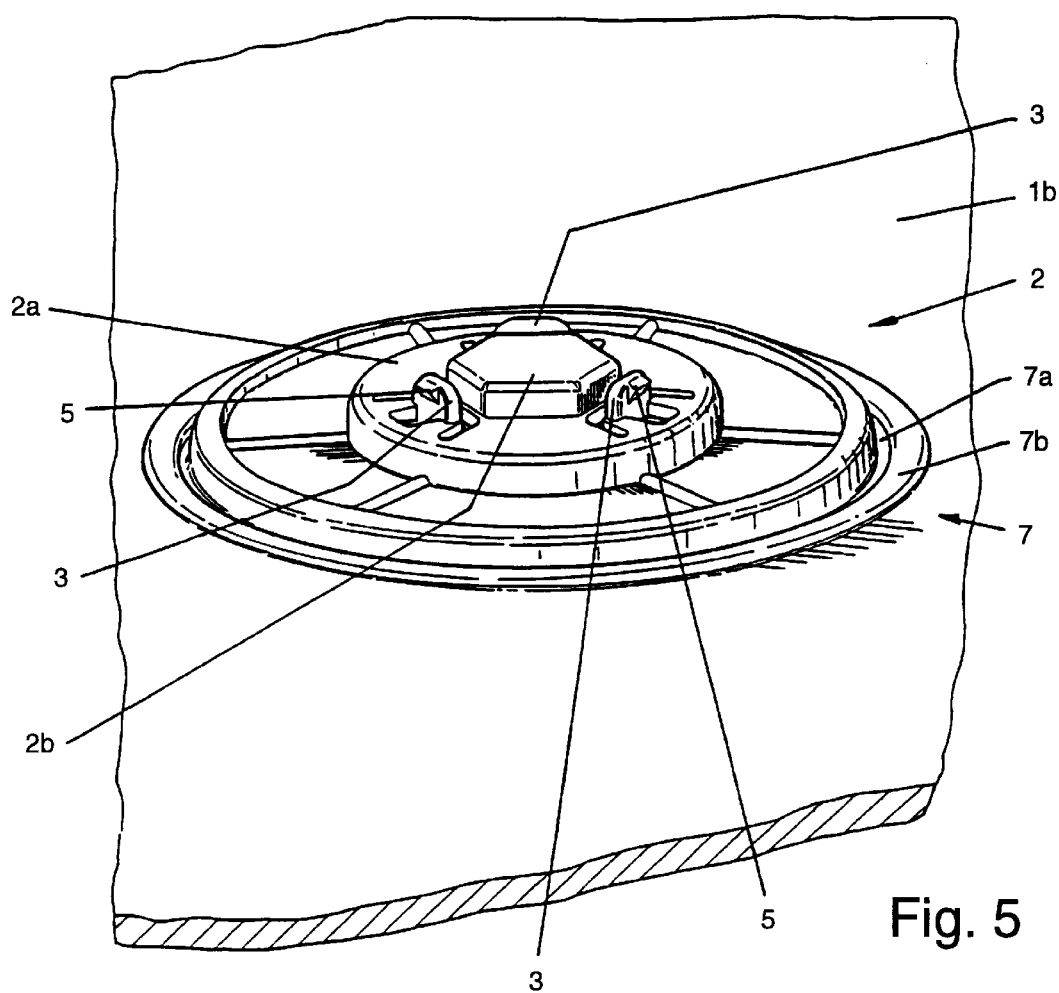
FIG. 5 is a partial perspective view of the disc-engaging portion of a case for storing a disc-shaped magnetic recording carrier according to an alternative embodiment of the invention.
Figure 6:
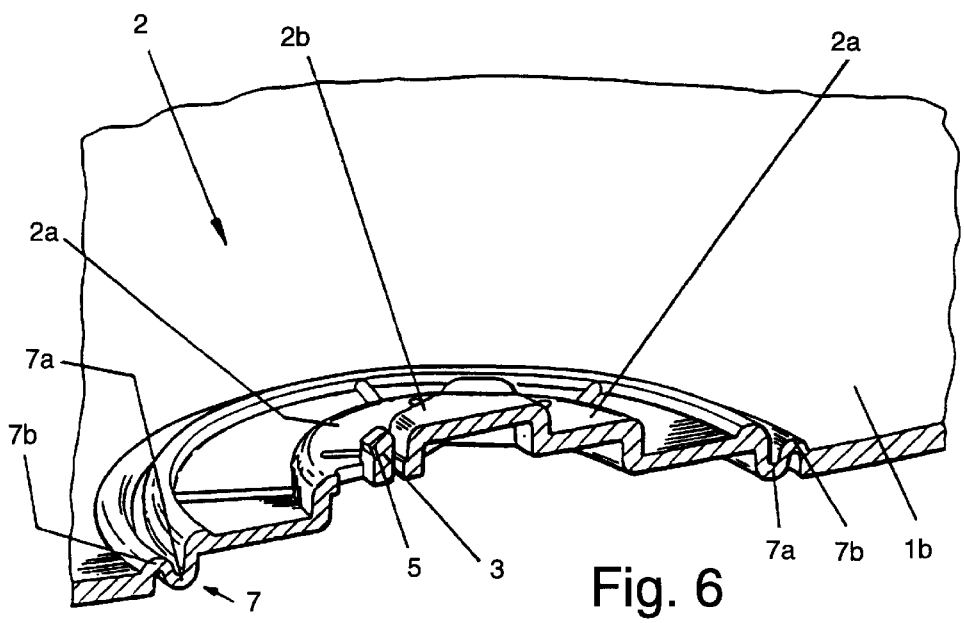
FIG. 6 is a cross-sectional perspective view of the embodiment shown in FIG. 5.
Figure 7:
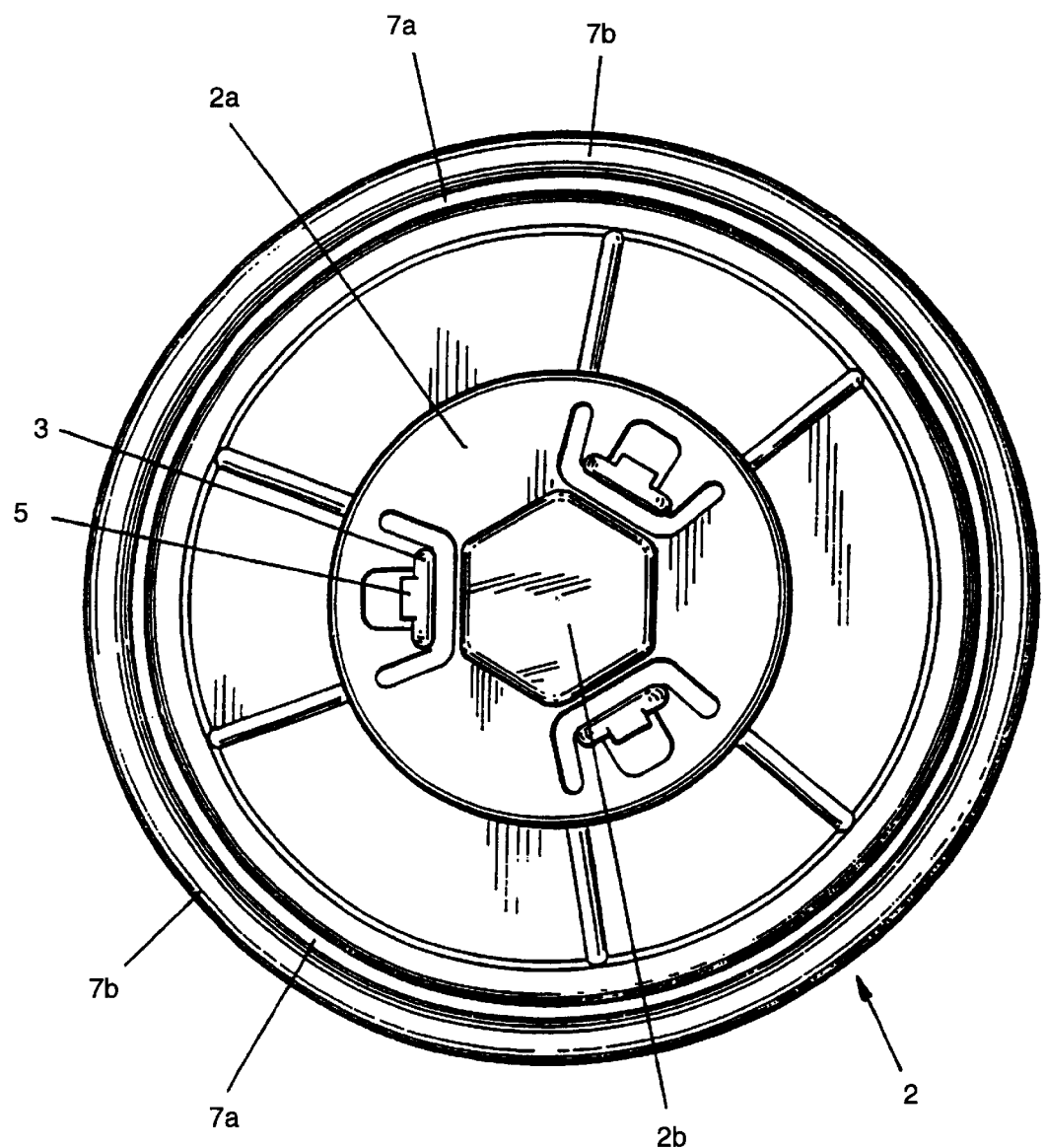
FIG. 7 is a top plan view of the embodiment shown in FIG. 5.

Referring now to FIGS. 5–7, an alternative embodiment of the present invention is shown. Elements identical to those used in the embodiment of the invention shown in FIGS. 1–4 are represented in FIGS. 5–7 by reference numerals identical to those used in FIGS. 1–4. As is shown in FIG. 5, the cylindrical platform 2 is connected to the bottom wall 1b by a joined hinge 7. The hinge 7 includes a cylindrically-shaped depressed portion 7a which is integrally formed with a raised portion 7b. Depressed portion 7a is positioned concentrically within and cooperates with raised portion 7b for releasing a disc from the stems 3. The disc is released by exerting downward pressure on the button 2b, which in turn moves the jointed hinge 7, causing the cylindrical formation 2a to move downwardly toward the bottom wall 1b. The downward movement of the cylindrical formation 2a biases the stems 3 inwardly toward the button 2b, which releases the disc from the retention cogs 5.

A case for storing a disc-shaped magnetic recording carrier has been disclosed. Various details of the invention may be changed without departing from its scope. Furthermore, the foregoing description of the preferred embodiments of the invention and the best mode for practicing the invention are provided for the purpose of illustration only and not for the purpose of limitation—the invention being defined by the claims.

What is claimed is:

1. In a case for storing a disc-shaped magnetic recording carrier having upper and lower faces, an outer edge, and an inner edge defining a central circular opening, the case including a floor positioned within a frame, and a plurality of spaced-apart segments connected to the floor to form a cylindrical rim and cooperating with one another to engage the outer edge of the magnetic recording carrier, the improvement comprising:

(a) a first cylindrical raised seat positioned on a central location on the floor and adapted for receiving the recording carrier thereon; and
(b) a second cylindrical raised seat positioned in a central location on said first cylindrical raised seat and including:
  (i) a button positioned above the horizontal plane and on an upper face of said second cylindrical raised seat and including a polygonal sidewall having upper and lower edges, and a face having an outer edge connected to said upper edge; and
  (ii) a plurality of spaced-apart tabs positioned adjacent said polygonal sidewall and movable toward the sidewall in response to radially-directed inward pressure against said tabs, each of the tabs including a vertical face having a wedge-shaped notch thereon biased towards and engaging the inner edge of the opening of the recording carrier in the absence of radially-directed inward pressure against the tab.

2. In a case for storing a disc-shaped magnetic recording carrier according to claim 1, wherein said polygonal sidewall comprises an even number of sidewall segments.

3. In a case for storing a disc-shaped magnetic recording carrier according to claim 2, wherein said tabs are positioned adjacent alternating sidewall segments.

4. In a case for storing a disc-shaped magnetic recording carrier according to claim 3, wherein said polygonal sidewall comprises six sidewall segments.

5. In a case for storing a disc-shaped magnetic recording carrier according to claim 4, wherein the plurality of spaced-apart tabs comprises three spaced-apart tabs.

6. In a case for storing a disc-shaped magnetic recording carrier according to claim 1, wherein said polygonal sidewall comprises three sidewall segments.

7. In a case for storing a disc-shaped magnetic recording carrier according to claim 1, wherein said vertical face is carried on the second cylindrical raised seat by one arm having a first end formed with said upper face and a second free end extending inwardly toward the button for supporting the lower face of the recording carrier.

8. In a case for storing a disc-shaped magnetic recording carrier according to claim 1, and including a flexible hinge connecting the first cylindrical raised seat to the floor for permitting the first and second cylindrical raised seats and the button to be moved toward the floor in response to downward pressure on the face of the button for releasing the recording carrier from the tabs.

9. In a case for storing a disc-shaped magnetic recording carrier according to claim 8, wherein said polygonal sidewall comprises an even number of sidewall segments.

10. In a case for storing a disc-shaped magnetic recording carrier according to claim 9, wherein said tabs are positioned adjacent alternating sidewall segments.

11. In a case for storing a disc-shaped magnetic recording carrier according to claim 10, wherein said polygonal sidewall comprises six sidewall segments.

12. In a case for storing a disc-shaped magnetic recording carrier according to claim 11, wherein the plurality of spaced-apart tabs comprises three spaced-apart tabs.

13. In a case for storing a disc-shaped magnetic recording carrier according to claim 8, wherein said polygonal sidewall comprises three sidewall segments.

14. In a case for storing a disc-shaped magnetic recording carrier according to claim 8, wherein said vertical face is carried on the second cylindrical raised seat by an arm having a first end formed with said upper face and a second free end extending inwardly toward the button for supporting the lower face of the recording carrier.

* * * * *